United States Patent
Visotsky et al.

(10) Patent No.: US 7,742,452 B2
(45) Date of Patent: Jun. 22, 2010

(54) SYSTEM AND METHOD FOR DYNAMIC PREAMBLE ASSIGNMENT

(75) Inventors: Eugene Visotsky, Buffalo Grove, IL (US); Shyamal Ramachandran, Heathrow, FL (US); Philippe J. Sartori, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 594 days.

(21) Appl. No.: 11/620,456

(22) Filed: Jan. 5, 2007

(65) Prior Publication Data
US 2008/0165748 A1 Jul. 10, 2008

(51) Int. Cl.
*H04W 4/00* (2009.01)
(52) U.S. Cl. ............ 370/331; 370/332; 370/341; 370/315; 455/436; 455/447; 455/450
(58) Field of Classification Search ......... 370/338, 370/328–333, 341; 455/436, 442–447, 450, 455/452.1, 452.2
See application file for complete search history.

(56) References Cited

U.S. PATENT DOCUMENTS

| | | | | |
|---|---|---|---|---|
| 6,052,364 | A * | 4/2000 | Chalmers et al. | 370/312 |
| 6,915,130 | B1 * | 7/2005 | Chapman et al. | 455/434 |
| 2005/0288028 | A1 * | 12/2005 | Lim et al. | 455/442 |
| 2006/0003767 | A1 * | 1/2006 | Kim et al. | 455/436 |
| 2006/0285505 | A1 | 12/2006 | Cho et al. | |
| 2007/0086387 | A1 * | 4/2007 | Kang et al. | 370/331 |
| 2007/0105558 | A1 * | 5/2007 | Suh et al. | 455/436 |
| 2007/0105585 | A1 * | 5/2007 | Lee et al. | 455/525 |
| 2007/0123292 | A1 * | 5/2007 | Kang et al. | 455/525 |
| 2007/0153758 | A1 * | 7/2007 | Kang et al. | 370/338 |
| 2007/0161374 | A1 * | 7/2007 | Kienstra et al. | 455/436 |
| 2007/0281702 | A1 * | 12/2007 | Lim et al. | 455/442 |
| 2008/0013606 | A1 * | 1/2008 | Boariu et al. | 375/211 |
| 2008/0031197 | A1 * | 2/2008 | Wang et al. | 370/331 |
| 2008/0107078 | A1 * | 5/2008 | Viorel et al. | 370/331 |

FOREIGN PATENT DOCUMENTS

WO 2008085565 A1 7/2008

OTHER PUBLICATIONS

Wang et al—"Relay-Station Preamble Segment Assignment/Re-Assignment Scheme"; IEEE 802.16j-06/199—Broadband Wireless Access Working Group—Nov. 2006—12 Pages an.
A. Czylwik, "Adaptive OFDM for Wideband Radio Channels"; Proceedings of IEEE Globecom 1996, pp. 713-718.
Classon et al—"Multi-dimensional Adaptation and Multi-user Scheduling Techniques for Wireless OFDM Systems", Proceedings of IEEE ICC 2003, May 2003, pp. 2251 2255.
PCT International Article 19 Amendment Application No. PCT/US2007/80065 Dated May 6, 2008—7 pages.
PCT International Search Report and Written Opinion Application No. PCT/US2007/80065 Dated Mar. 14, 2008—8 Pages.

* cited by examiner

*Primary Examiner*—Kent Chang
*Assistant Examiner*—Magdi Elhag
(74) *Attorney, Agent, or Firm*—Randi L. Karpinia (57) ABSTRACT

A method of operation of a multi-hop wireless communication system comprising operating a first device to communicate with one or more network devices using a preamble sequence; locating the first device within range of a network entity; and switching the preamble sequence of the first device to a second preamble for communicating with the one or more network devices.

15 Claims, 9 Drawing Sheets

SYSTEM AND METHOD FOR DYNAMIC PREAMBLE ASSIGNMENT

FIELD OF THE INVENTION

The present invention relates generally to wireless communication systems and more particularly to the operation of a communication network utilizing relay stations.

BACKGROUND

An infrastructure-based wireless network typically includes a communication network with fixed and wired gateways. Many infrastucture-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network, Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of adhoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination IEEE 802.16 is a point-to-multipoint (PMP) system with one hop links between a base station (BS) and a subscriber station (SS). Such network topologies severely stress link budgets at the cell boundaries and often render the subscribers at the cell boundaries incapable of communicating using the higher-order modulations that their radios can support. Pockets of poor-coverage areas are created where high data-rate communication is impossible. This in turn brings down the overall system capacity. While such coverage voids can be avoided by deploying BSs tightly, this drastically increases both the capital expenditure (CAPEX) and operational expenditure (OPEX) for the network deployment. A cheaper solution is to deploy relay stations (RSs) (also known as relays or repeaters) in the areas with poor coverage and repeat transmissions so that subscribers in the cell boundary can connect using high data rate links.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to dynamic preamble assignment within a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element, It will be appreciated that embodiments of the invention described herein may be comprised of one or more conventional processors and unique stored program instructions that control the one or more processors to implement, in conjunction with certain non-processor circuits, some, most, or all of the functions of dynamic preamble assignment within a wireless communication network described herein. The non-processor circuits may include, but are not limited to, a radio receiver, a radio transmitter, signal drivers, clock circuits, power source circuits, and user input devices. As such, these functions may be interpreted as steps of a method to perform dynamic preamble assignment within a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
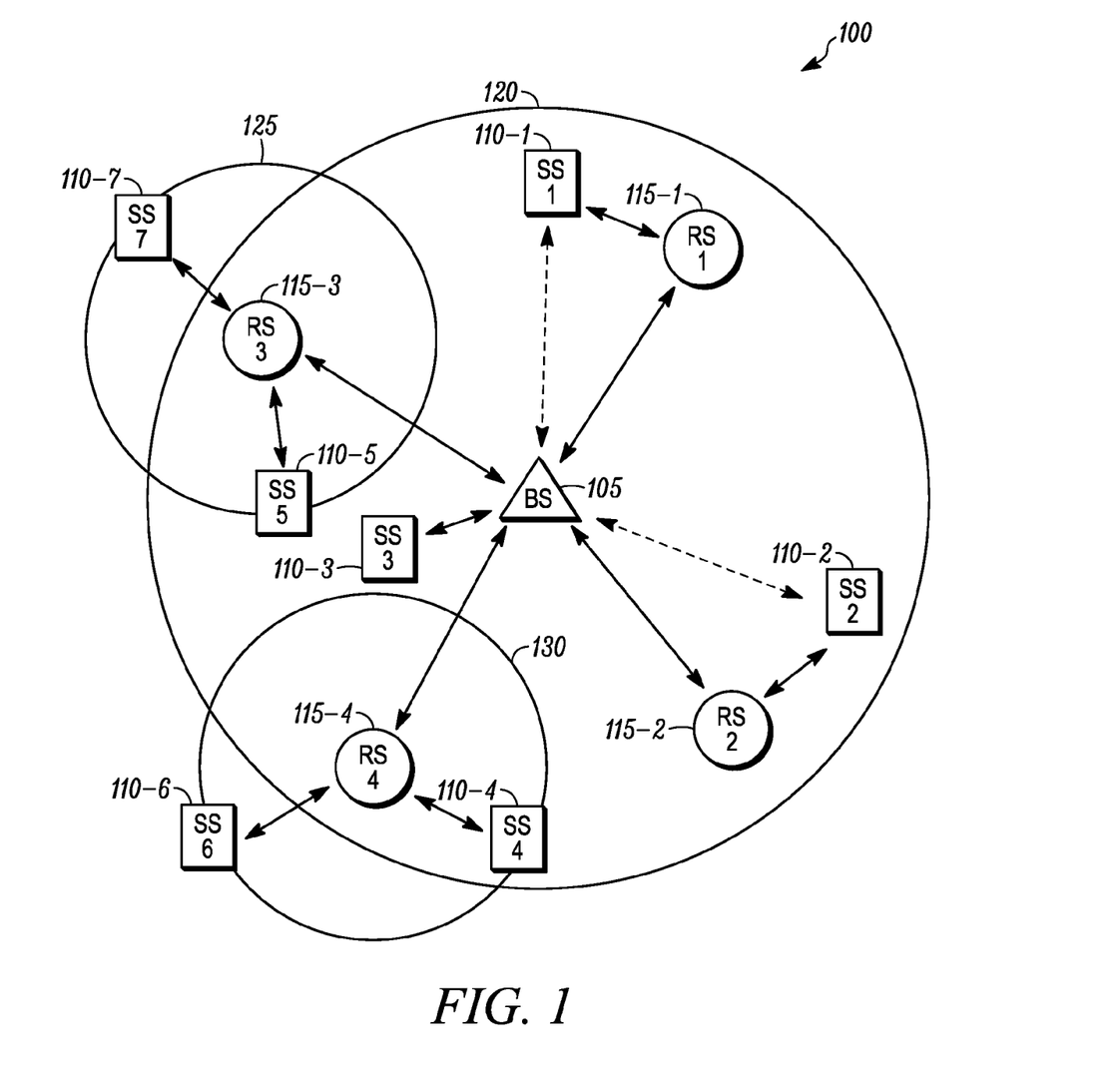
FIG. 1 illustrates an exemplary wireless communication network.

FIG. 1 illustrates an exemplary wireless communication network for use in the implementation of at least some embodiments of the present invention. FIG. 1 specifically illustrates an IEEE 802.16 network 100. As illustrated, the network 100 includes at least one base station 105 for communication with a plurality of subscriber stations 110-n (also referred to as mobile stations). The exemplary network 100 further includes a plurality of relays 115-n (also known as relay stations or repeaters), The relays 115-n are deployed in the areas with poor coverage and repeat transmissions so that subscriber stations 110-n in a cell boundary can connect using high data rate links. In some cases relays 115-n may also serve subscriber stations 110-n that are out of the coverage range of the base station 105. In some networks, the relays 115-n are simpler versions of the base station 105, in that they do not manage connections, but only assist in relaying data. Alternatively, the relays 115-n can be at least as complex as the base station 105.

Figure 2:
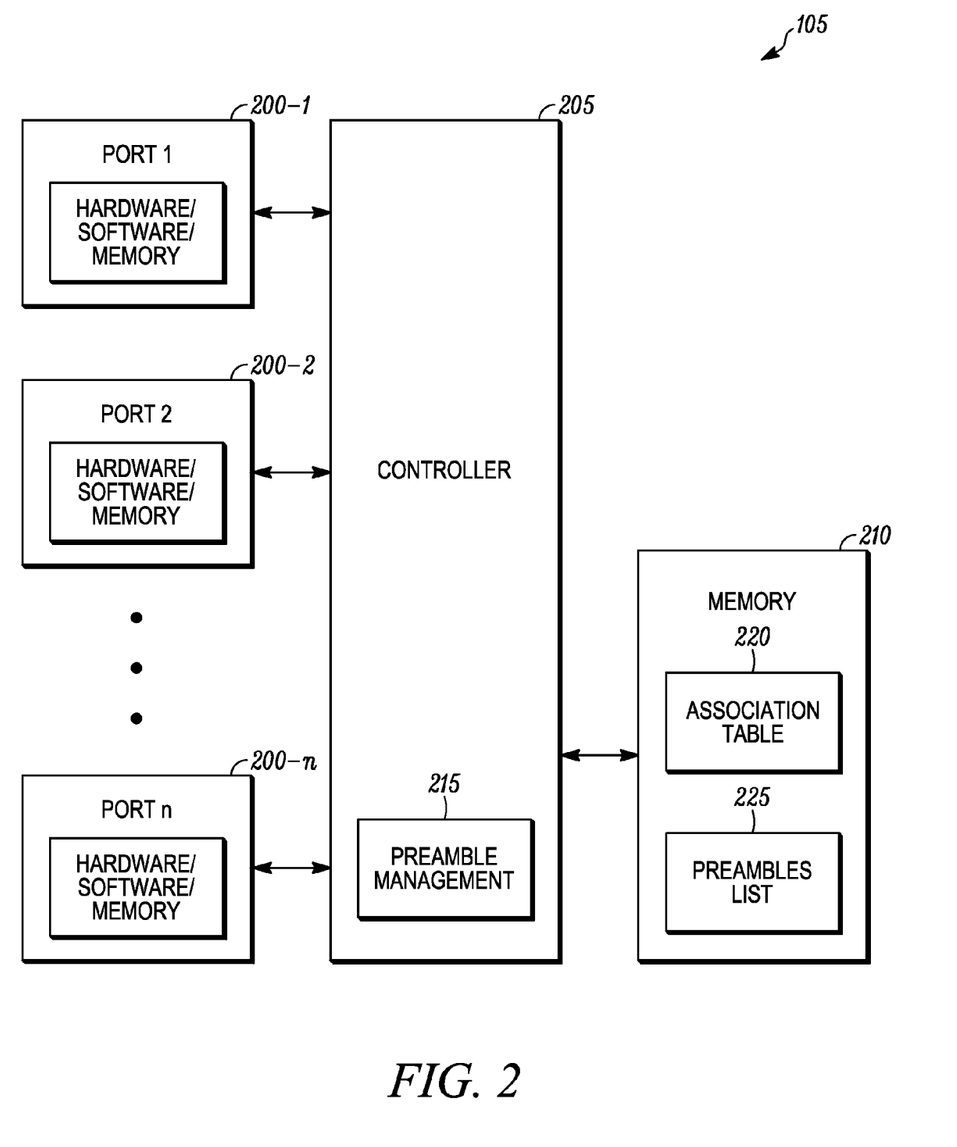
FIG. 2 illustrates an exemplary base station for use in the exemplary wireless communication network of FIG. 1 in accordance with some embodiments of the present invention.

FIG. 2 illustrates an exemplary base station 105 in accordance with some embodiments of the present invention. As illustrated, the base station 105 comprises a plurality of ports 200-n, a controller 205, and a memory 210.

Each port 200-n provides an endpoint or "channel" for network communications by the base station 105. Each port 200-n may be designated for use as, for example, an IEEE 802.16 port or a backhaul port. For example, the base station 105 can communicate with one or more relay stations and/or one or more subscriber stations within an 802.16 network using an IEEE 802.16 port. An IEEE 802.16 port, for example, can be used to transmit and receive both data and management information.

A backhaul port similarly can provide an endpoint or channel for backhaul communications by the base station 105. For example, the base station 105 can communicate with one or more other base stations using the backhaul, which can be wired or wireless, via the backhaul port.

Each of the ports 200-n are coupled to the controller 205 for operation of the base station 105. Each of the ports employs conventional demodulation and modulation techniques for receiving and transmitting communication signals respectively, such as packetized signals, to and from the base station 105 under the control of the controller 205. The packetized data signals can include, for example, voice, data or multimedia information, and packetized control signals, including node update information.

The controller 205 includes a preamble management block 215, which will be described in detail hereinafter. It will be appreciated by those of ordinary skill in the art that the preamble management block 215 can be hard coded or programmed into the base station 105 during manufacturing, can be programmed over-the-air upon customer subscription, or can be a downloadable application. It will be appreciated that other programming methods can be utilized for programming the preamble management block 215 into the base station 105. It will be further appreciated by one of ordinary skill in the art that the preamble management block 215 can be hardware circuitry within the base station. In accordance with the present invention, the preamble management block 215 can be contained within the controller 205 as illustrated, or alternatively can be an individual block operatively coupled to the controller 205 (not shown).

To perform the necessary functions of the base station 105, the controller 205 is coupled to the memory 210, which preferably includes a random access memory (RAM), a read-only memory (ROM), an electrically erasable programmable read-only memory (EEPROM), and flash memory.

The memory 210 includes storage locations for the storage of an association table 220. The association table 220, in accordance with the present invention, stores a listing of all subscriber stations 110-n and relay stations 115-n under the base station's domain along with other parameters such as the end-to-end path metrics to each of the subscriber stations 110-n and relay stations 115-n under its domain.

The memory 210 further includes storage locations for the storage of a preambles list 225. The preambles list 225 includes a list of preambles already in use in the neighborhood of the base station 105. The base station 105 obtains this list by logging the preambles of the relay stations 115-n (mobile or stationary) that are under its control, as well as the preambles of the neighboring base stations. It will be appreciated that the preambles list 225 can be included within the association table 220 or stored in separate memory locations in accordance with the various embodiments of the present invention.

It will be appreciated by those of ordinary skill in the art that the memory 210 can be integrated within the base station 105, or alternatively, can be at least partially contained within an external memory such as a memory storage device. The memory storage device, for example, can be a subscriber identification module (SIM) card.

Figure 3:
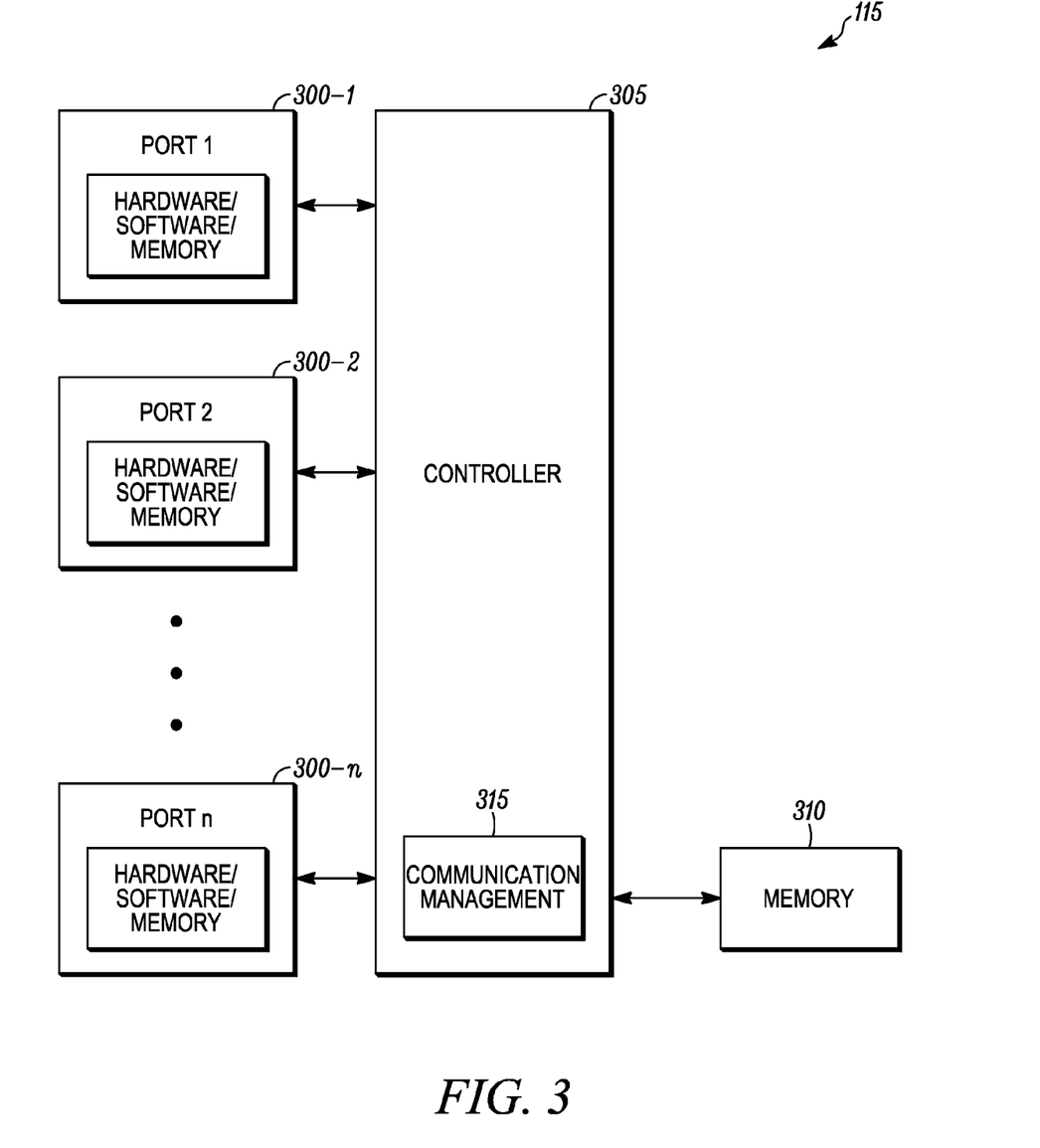
FIG. 3 illustrates an exemplary relay station for use in the exemplary wireless communication network of FIG. 1 in accordance with some embodiments of the present invention.

FIG. 3 illustrates an exemplary relay station 115 in accordance with some embodiments of the present invention. As illustrated, the relay station 115 comprises a plurality of ports 300-n. Each port 300-n may be designated for use as, for example, an IEEE 802.16 port or a backhaul port. For example, the plurality of ports 300-n can include an IEEE 802.16 port, which is used to communicate with one or more base stations, one or more relay stations and/or one or more subscriber stations. The relay station 115 further comprises a controller 305 and a memory 310.

An IEEE 802.16 port, for example, provides an endpoint or "channel" for 802.16 network communications by the relay station 115. For example, the relay station 115 can communicate with one or more base stations and/or one or more relay stations and/or one or more subscriber stations within an 802.16 network using the IEEE 802.16 port. An IEEE 802.16 port, for example, can be used to transmit and receive both data and management information.

Each of the ports 300-n are coupled to the controller 305 for operation of the relay station 115. Each of the ports employs conventional demodulation and modulation techniques for receiving and transmitting communication signals respectively, such as packetized signals, to and from the relay station 115 under the control of the controller 305. The packetized data signals can include, for example, voice, data or multimedia information, and packetized control signals, including node update information, In accordance with the present invention, the controller 305 includes a communication management block 315 for managing communication links between the relay station 115 and one or more base stations 105-n and one or more subscriber stations 110-n as will be described hereinafter. For example, the communication management block 315 manages the determination of preambles to be used in communication with various base stations in accordance with some embodiments of the present invention. It will be appreciated by those of ordinary skill in the art that the communication management block 315 can be hard coded or programmed into the relay station 115 during manufacturing, can be programmed over-the-air upon customer subscription, or can be a downloadable application. It will be appreciated that other programming methods can be utilized for programming the communication management block 315 into the relay station 115. It will be further appreciated by one of ordinary skill in the art that the communication management block 315 can be hardware circuitry within the relay station 115. In accordance with the present invention, the communication management block 315 can be contained within the controller 305 as illustrated, or alternatively can be individual blocks operatively coupled to the controller 305 (not shown).

To perform the necessary functions of the relay station 115, the controller 305, and/or the communication management block 315 are each coupled to the memory 310, which preferably includes a random access memory (RAM), a read-only memory (ROM), an electrically erasable programmable read-only memory (EEPROM), and flash memory. The memory 310, for example, can include storage locations for an association table (not shown) containing information related to the various subscriber stations 110-n associated with the relay station 115. It will be appreciated by those of ordinary skill in the art that the memory 310 can be integrated within the relay station 115, or alternatively, can be at least partially contained within an external memory such as a memory storage device. The memory storage device, for example, can be a subscriber identification module (SIM) card.

In typical systems such as the network 100, IEEE 802.16 base stations (BSs) do not forward traffic to other base stations on the IEEE 802.16 air interface. Further, IEEE 802.16 Relays (RSs) can forward traffic to base stations, relay stations, or subscriber stations (SSs). As previously mentioned, the relay stations are themselves managed/controlled by at least one of the base stations. Further relay stations can be fixed, nomadic or mobile.

As illustrated in FIG. 1, the relay stations 15-n of the network 100 can provide communication coverage outside the base station coverage area 120. For example, a relay station 3 115-3 provides a coverage area 125 and a relay station 4 115-4 provides a coverage area 130 which include communication coverage outside of a coverage area 120 of the base station 105. Thus communication by relay station 3 115-3 can include communication for subscriber station 7 110-7; and communication by relay station 4 115-4 can include communication for subscriber station 6 110-6, which otherwise would not be possible directly to the base station 105. Since subscriber station 6 110-6 and subscriber station 7 110-7 cannot be controlled by the base station 105 directly, they are entirely controlled by the relay stations 115-4 and 115-3 respectively, or by the base station 105 through the relay stations 115-4 and 115-3 respectively, In summary, the relay stations (RS) introduced in an IEEE 802.16 system, can provide coverage and capacity gains by extending the base station's (BS) range and permitting subscriber stations (SS) to multihop to the BS.

Figure 4:
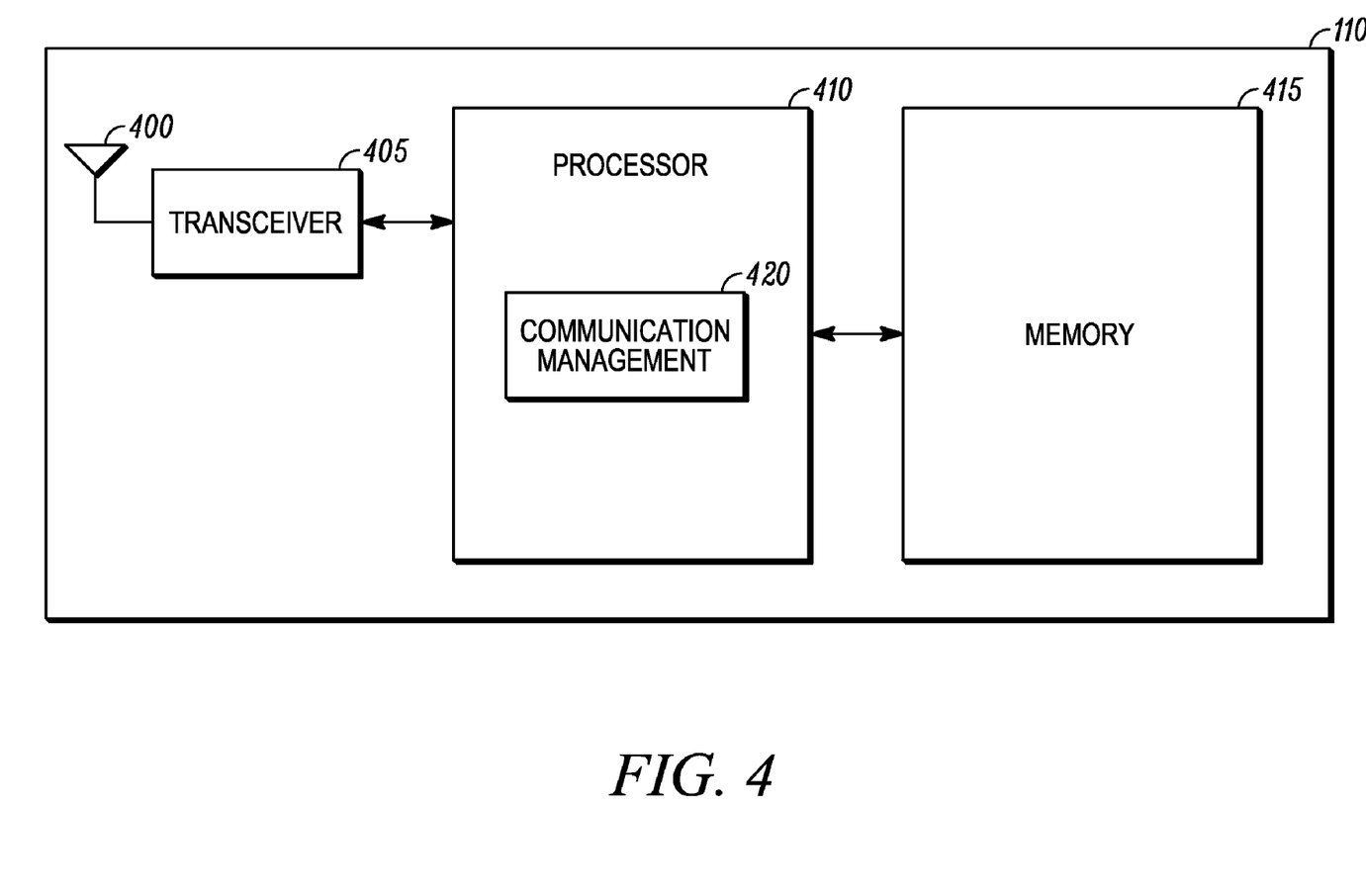
FIG. 4 illustrates an exemplary subscriber station for use in the exemplary wireless communication network of FIG. 1 in accordance with at least some embodiments of the present invention.

FIG. 4 is an electronic block diagram of one embodiment of a subscriber station 110 in accordance with the present invention. The terminology "subscriber station" and "mobile station" are used interchangeably herein to refer to subscribers who may be fixed, nomadic or mobile. As illustrated, the subscriber station 110 includes an antenna 400, a transceiver (or modem) 405, a processor 410, and a memory 415.

The antenna 400 intercepts transmitted signals from one or more base stations 105, one or more relay stations 115, and/or one or more subscriber stations 110 within the network 100 and transmits signals to the one or more base stations 105, one or more relay stations 115, and/or one or more subscriber stations 110 within the network 100. The antenna 400 is coupled to the transceiver 405, which employs conventional demodulation techniques for receiving and transmitting communication signals, such as packetized signals, to and from the subscriber station 110 under the control of the processor 410. The packetized data, signals can include, for example, voice, data or multimedia information, and packetized control signals, including node update information. When the transceiver 405 receives a command from the processor 410, the transceiver 405 sends a signal via the antenna 400 to one or more devices within the network 100. For example, the subscriber station 110 can communicate with one or more base stations and/or one or more relay stations and/or one or more subscriber stations within an 802.16 network by the antenna 400 and the transceiver 405 using IEEE 802.16, for example, to transmit and receive both data and management information.

In an alternative embodiment (not shown), the subscriber station 110 includes a receive antenna and a receiver for receiving signals from the network 100 and a transmit antenna and a transmitter for transmitting signals to the network 100. It will be appreciated by one of ordinary skill in the art that other similar electronic block diagrams of the same or alternate type can be utilized for the subscriber station 110.

Coupled to the transceiver 405, is the processor 410 utilizing conventional signal-processing techniques for processing received messages. It will be appreciated by one of ordinary skill in the art that additional processors can be utilized as required to handle the processing requirements of the processor 410.

In accordance with the present invention, the processor 410 includes a communication management block 420 for managing communication between the subscriber station 110 and at least one base station 105, relay station 115, or subscriber station 110. For example, the communication management block 420 can receive a preamble from a relay station 115 for use in communicating with the relay station as will be described hereinafter. It will be appreciated by those of ordinary skill in the art that the communication management block 420 can be hard coded or programmed into the subscriber station 110 during manufacturing, can be programmed over-the-air upon customer subscription, or can be a downloadable application. It will be appreciated that other programming methods can be utilized for programming the communication management block 420 into the subscriber station 110. It will be further appreciated by one of ordinary skill in the art that the communication management block 420 can be hardware circuitry within the subscriber station 110. In accordance with the present invention, the communication management block 420 can be contained within the processor 410 as illustrated or alternatively can be an individual block operatively coupled to the processor 410 (not shown), To perform the necessary functions of the subscriber station 110, the processor 410 is coupled to the memory 415, which preferably includes a random access memory (RAM), a read-only memory (ROM), an electrically erasable programmable read-only memory (EEPROM), and flash memory. It will be appreciated by those of ordinary skill in the art that the memory 415 can be integrated within the subscriber station 110, or alternatively, can be at least partially contained within an external memory such as a memory storage device. The memory storage device, for example, can be a subscriber identification module (SIM) card.

The IEEE 802.16j standard requires that the specification for the air interface link between an RS and a subscriber station (SS) is to remain unchanged from the 802.16e specification for the air interface between a base station (BS) and an SS. This requirement of backwards compatibility with the 802.16e standard on the RS-to-SS link implies that the RS transmits a preamble in the first symbol of the frame, just as an 802.16e BS transmits its own preamble in the first symbol of the frame. An SS-directed preamble transmitted from a BS or a RS must be drawn from a pool of available preambles as defined in the IEEE 802.16e-2005 specification. For example, for a ten MegaHertz (10 MHz) system, 114 distinct preambles are defined in the standard. For a fixed RS, a permanent preamble assignment can be made, whereby to minimize interference the assigned preamble needs to be sufficiently different from other preambles already assigned to other RS and BS in the neighborhood of the RS. However, permanent preamble assignment for mobile or even nomadic relays is problematic, as these network entities could travel to various parts of the network where they would encounter different sets of interfering preambles.

Figure 5:
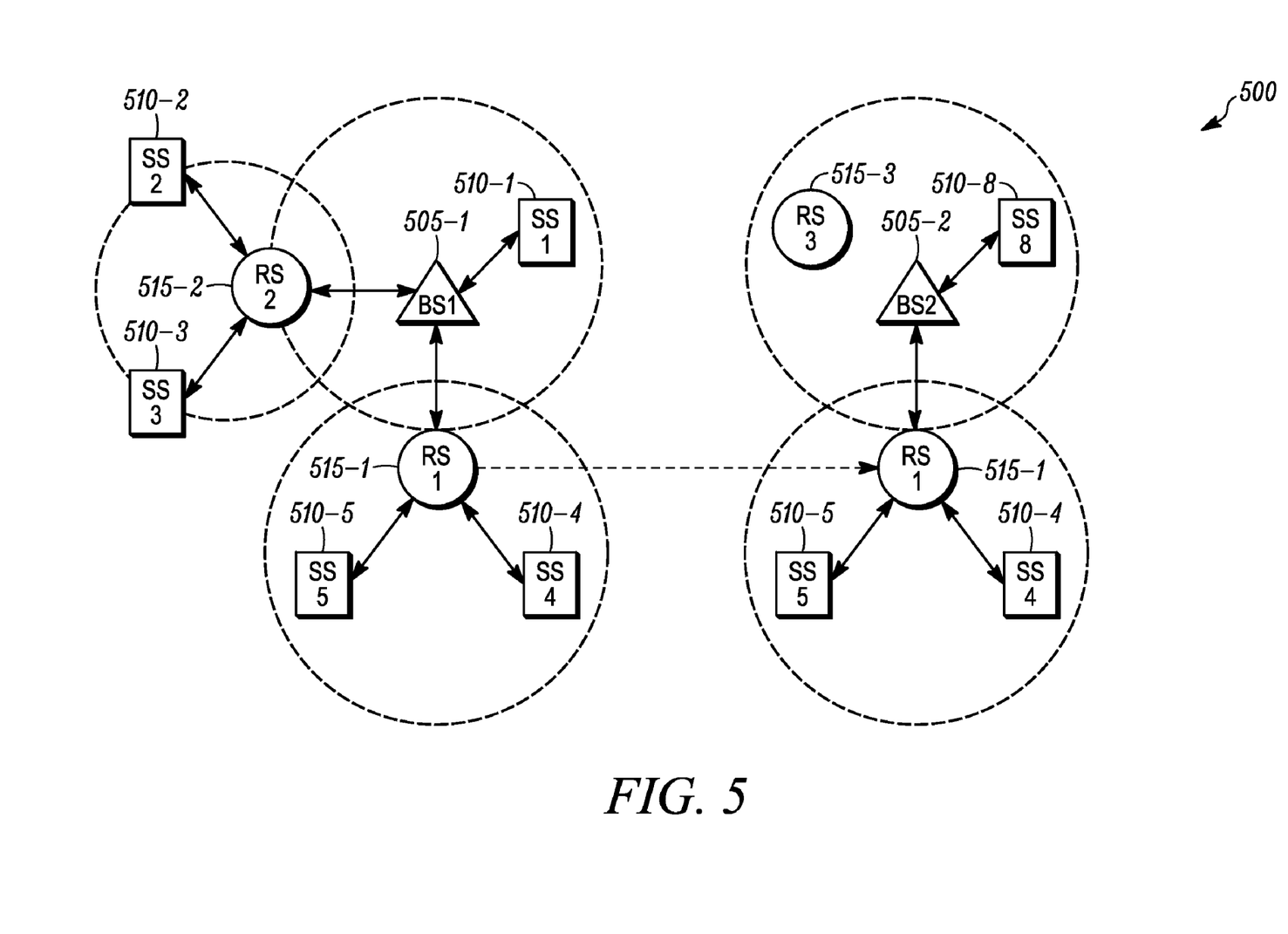
FIG. 5 illustrates an exemplary scenario within the wireless communication network of FIG. 1.

FIG. 5 illustrates an exemplary scenario within a wireless communication network 500. A mobile RS, denoted as RS1 515-1, is initially linked with BS1 505-1. As it moves away from BS1 505-1, RS1 515-1 becomes within range of BS2 505-2 and may eventually perform a handover or a transfer of association to BS2 505-2. However, because of the limited number of preamble sequences available, it may well happen that RS1 515-1 uses a preamble sequence that is already in use by another relay station associated with BS2 505-2 such as RS3 515-3, or worse by the BS2 505-2 itself If RS1 515-1 and BS2 505-2 do use the same preamble, RS1 515-1 as it moves towards BS2 505-2 will substantially interfere with the BS2 505-2 preamble transmission and will disrupt the synchronization and channel measurement process at the various subscriber stations such as SS8 510-8 in the BS2 505-2 coverage area. It is presumed herein that the system implementation utilizes partial usage of subchannels (PUSC). PUSC specifies the way subchannels (Orthogonal Frequency Division Multiple Access (OFDMA) subcarriers) are permuted. PUSC permutation is randomized for interference avoidance/averaging and to gain frequency diversity. As the PUSC permutation randomization is based on the preamble sequence, if RS1 515-1 uses the same PUSC permutation as BS2 505-2, it may substantial interfere with BS2 505-2 data transmissions. Hence, it is imperative that two network entities within the interference range of each other use distinguishable preamble sequences. Therefore, there is a need for a system and method for a mobile or nomadic RS to switch its preamble as it comes in range of another network entity that utilizes the same or similar preamble sequence. The preamble selected as a result of the switch preferably is one that optimizes (minimizes) the interference condition in the neighborhood.

General Procedure

Figure 6:
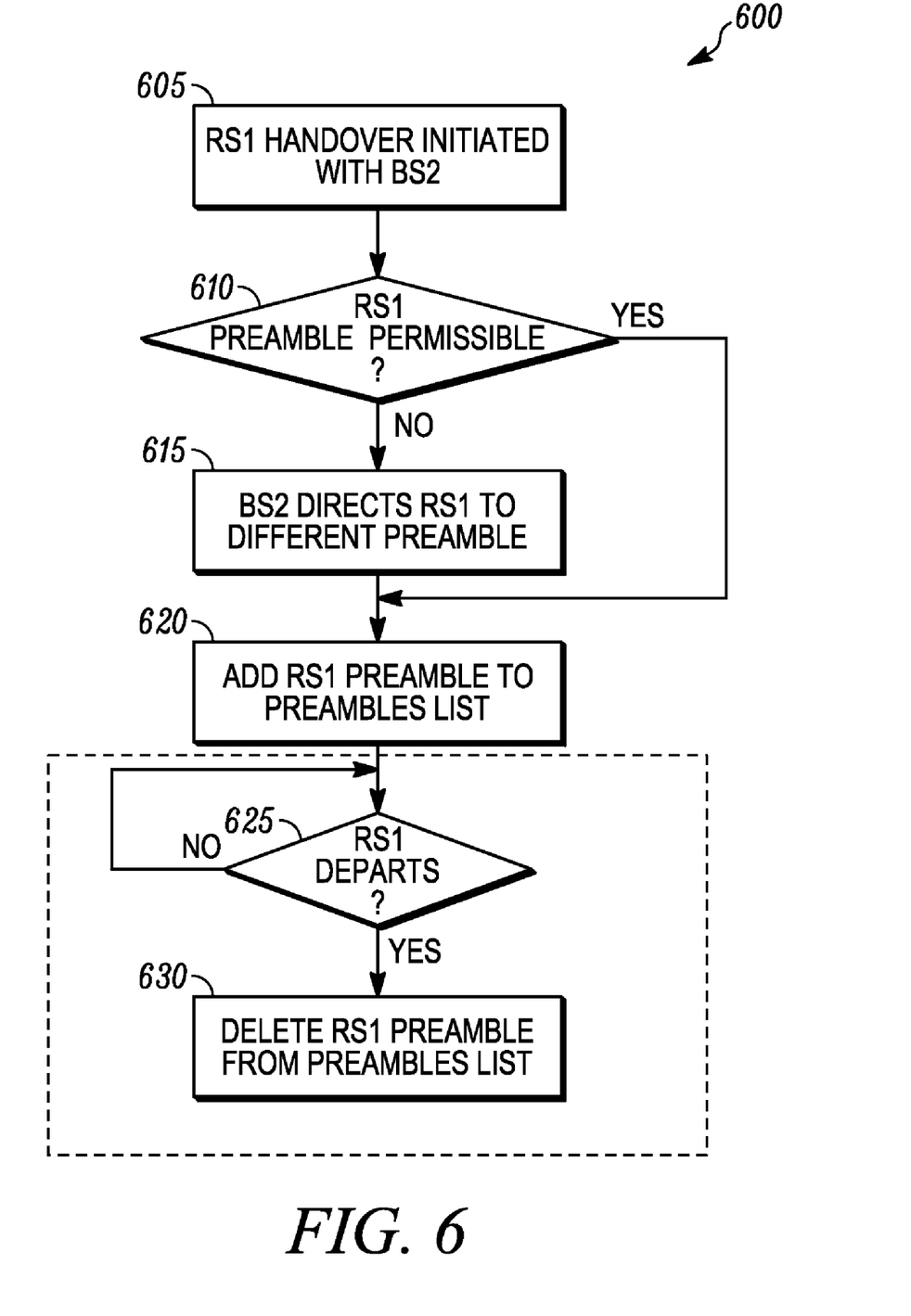
FIG. 6 is a flowchart illustrating an exemplary operation of the wireless communication network of FIG. 5 in accordance with at least some embodiments of the present invention.

Continuing with the example above and illustrated in FIG. 5, FIG. 6 is a flowchart illustrating the general operation of the wireless communication network 500 for implementing at least some embodiments of the present invention, As illustrated, the operation begins with Step 605 in which as RS1 515-1 comes in range of BS2 505-2, it will initiate a handover (or association) signaling exchange with BS2 505-2. It will be appreciated that in the course of this exchange RS1 515-1 announces the index of its SS-directed preamble to the BS2 505-2. As discussed previously with respect to FIG. 2, each BS keeps a list of forbidden preambles (i.e. the preambles list 225 of FIG. 2), that is a list of preambles not permitted for use within the neighborhood of the BS, For example, the preambles list can include one or more preambles already in use in the neighborhood of the BS. The BS obtains its preambles list by logging the preambles of the RS (mobile or stationary) that are under its control, as well as the preambles of any neighboring BS. Each BS in one embodiment can also inform its neighboring base stations of the preambles being used by its associated RSs. This information can also be carried in a BS's preambles list. In another embodiment, the preambles list contains the preambles being used as well as the preambles that are structurally similar and are highly correlated to the preambles being used. Next, in Step 610, BS 2 determines if the current preamble of RS1 515-1 is permissible. When the current preamble of RS1 515-1 is permissible (i.e. not contained within the preambles list, BS2 505-2 performs no action. However, when the current preamble of RS1 515-1 will disrupt on-going communication in the cell, in Step 615 BS2 505-2 directs RS1 515-1 to switch to another preamble and specifies the particular preamble sequence to be used at the RS1 515-1. Next, and when the preamble for RS1 515-1 was permissible in Step 610, the preamble sequence for RS1 515-1 is added to the list of currently utilized preambles maintained at BS2 505-2.

Optionally, in Step 625, when RS1 515-1 is a transient RS, the operation can check for the departing of RS1 515-1 from association with BS2 505-2. When RS1 515-1 departs the cell and performs handover to the next BS in Step 625, the operation continues to Step 630 in which this preamble sequence is deleted from the preambles list, Note that the process of preamble reassignment at the RS can be viewed as a dynamic method of system deployment, as each preamble is associated with a particular PUSC permutation and subchannelization scheme. Specifically, to enable PUSC ⅓ permutation, the set of possible preambles is subdivided into three subsets, with each subset corresponding to a segment occupying one third of the possible subcarriers. Preambles from different subsets are transmitted on different subcarriers and do no not interfere with each other. Hence, if a particular PUSC segment is used in a cell or sector, an RS may be assigned a preamble corresponding to another segment, thereby completely eliminating interference between the RS and BS preamble and data transmissions.

Preamble Assignment Protocol

Figure 7:
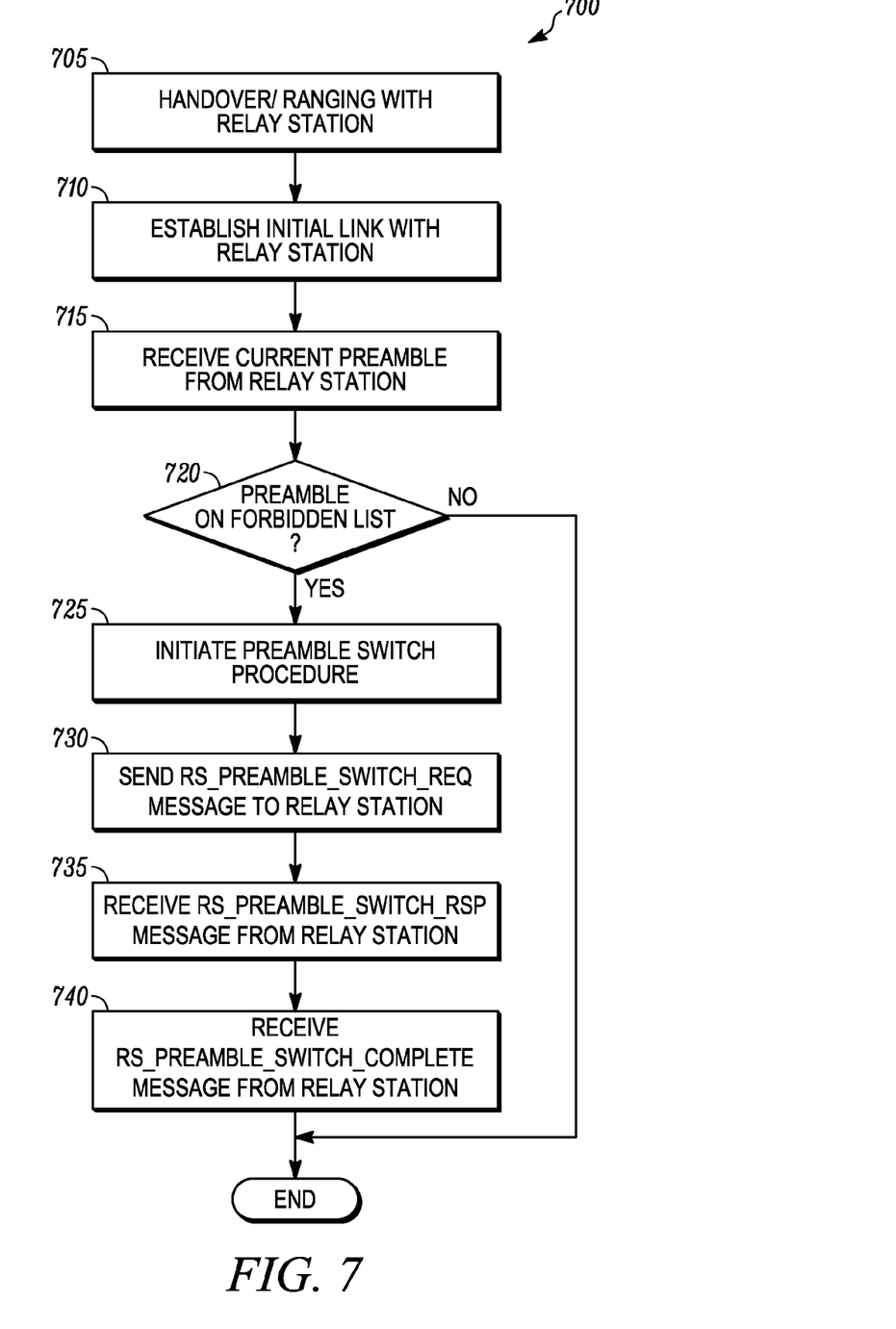
FIG. 7 is a flowchart illustrating an exemplary operation of the base station of FIG. 2 in accordance with at least some embodiments of the present invention.

FIG. 7 is a flowchart illustrating an exemplary preamble assignment procedure 700 at a base station for a relay station performing handover into the base station's cell. As illustrated, the operation begins with Step 705 in which the base station and the relay station perform a handover/ranging process into the cell for the relay station. Next, in Step 710, the base station establishes an initial link with the relay station. Next, in Step 715, the base station receives the index of the SS-directed preamble currently in use by the relay station from the relay station. Next, in Step 720, the base station determines whether the preamble is on the forbidden list. In Step 725, when the preamble is on the forbidden list, the base station initiates a preamble switch procedure.

Figure 8:
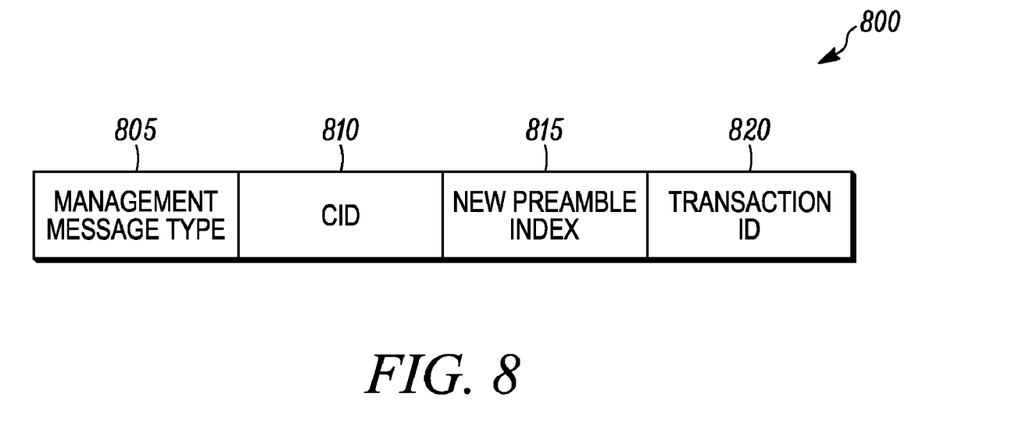
FIGS. 8 through 10 illustrate exemplary messages for use in the operation of the wireless communication networks of FIGS. 1 and 5 in accordance with at least some embodiments of the present invention.

In Step 730, the BS sends a RS-PREAMBLE-SWITCH-REQ message to instruct the relay station to switch to another preamble by specifying the IDcell and segment number of the new preamble. FIG. 8 illustrates an exemplary RS-PREAMBLE-SWITCH-REQ message 800 in accordance with some embodiments of the present invention. As illustrated, the RS-PREAMBLE-SWITCH-REQ message 800 includes a management message type field 805 which is typically 8 bits in size. The RS-PREAMBLE-SWITCH-REQ message 800 also includes a connection identification (CID) field 810 which is typically 16 bits in size and identifies the CID of the BS->RS link. The RS-PREAMBLE-SWITCH-REQ message 800 further includes the new preamble index 815 which is typically 7 bits in size and is the index of the new preamble sequence. The RS-PREAMBLE-SWITCH-REQ message 800 further includes a transaction ID 820 which is typically 8 bits in size.

Figure 9:
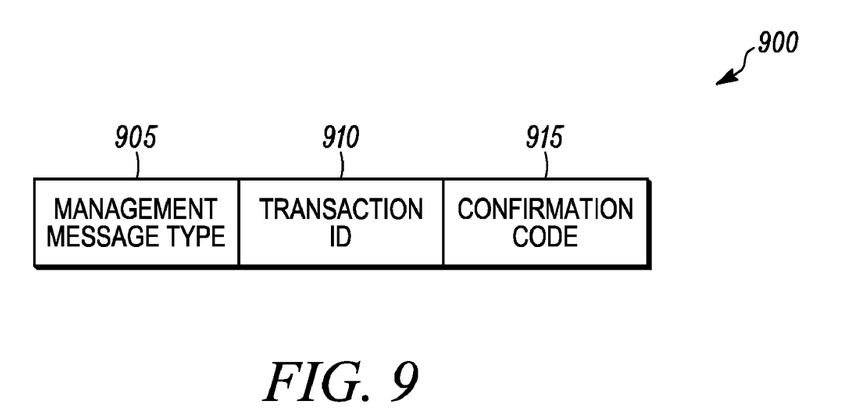

Next, in Step 735, the BS receives a RS-PREAMBLE-SWITCH-RSP message from the relay station as an acknowledgment. FIG. 9 illustrates an exemplary RS-PREAMBLE-SWITCH-RSP message 900 in accordance with at least some embodiments of the present invention, As illustrated, the RS-PREAMBLE-SWITCH-RSP message 900 includes a management message type 905 which is typically 8 bits in size, The RS-PREAMBLE-SWITCH-RSP message 900 further includes a transaction ID 910 which is typically 16 bits in size. The RS-PREAMBLE-SWITCH-RSP message 900 further includes a confirmation code 915 which is typically 8 bits in size.

Figure 10:
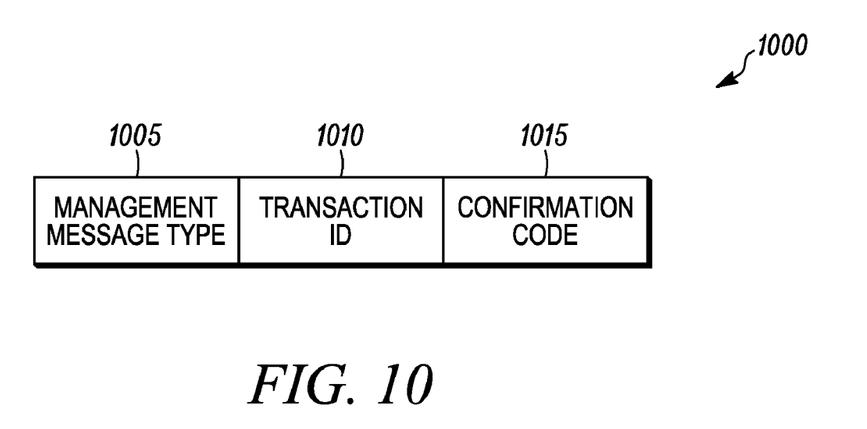

Next, in Step 740, the BS receives a RS-PREAMBLE-SWITCH-COMPLETE message from the relay station to indicate that the procedure is complete. FIG. 10 illustrates an exemplary RS-PREAMBLE-SWITCH-COMPLETE message 1000 in accordance with at least some embodiments of the present invention. The RS-PREAMBLE-SWITCH-COMPLETE message 1000 includes a management message type 1005 which is typically 8 bits in size. The RS-PREAMBLE-SWITCH-COMPLETE message 1000 further includes a transaction ID 1010 which is typically 16 bits in size, The RS-PREAMBLE-SWITCH-COMPLETE message 1000 further includes a confirmation code 1015 which is typically 8 bits in size.

Figure 11:
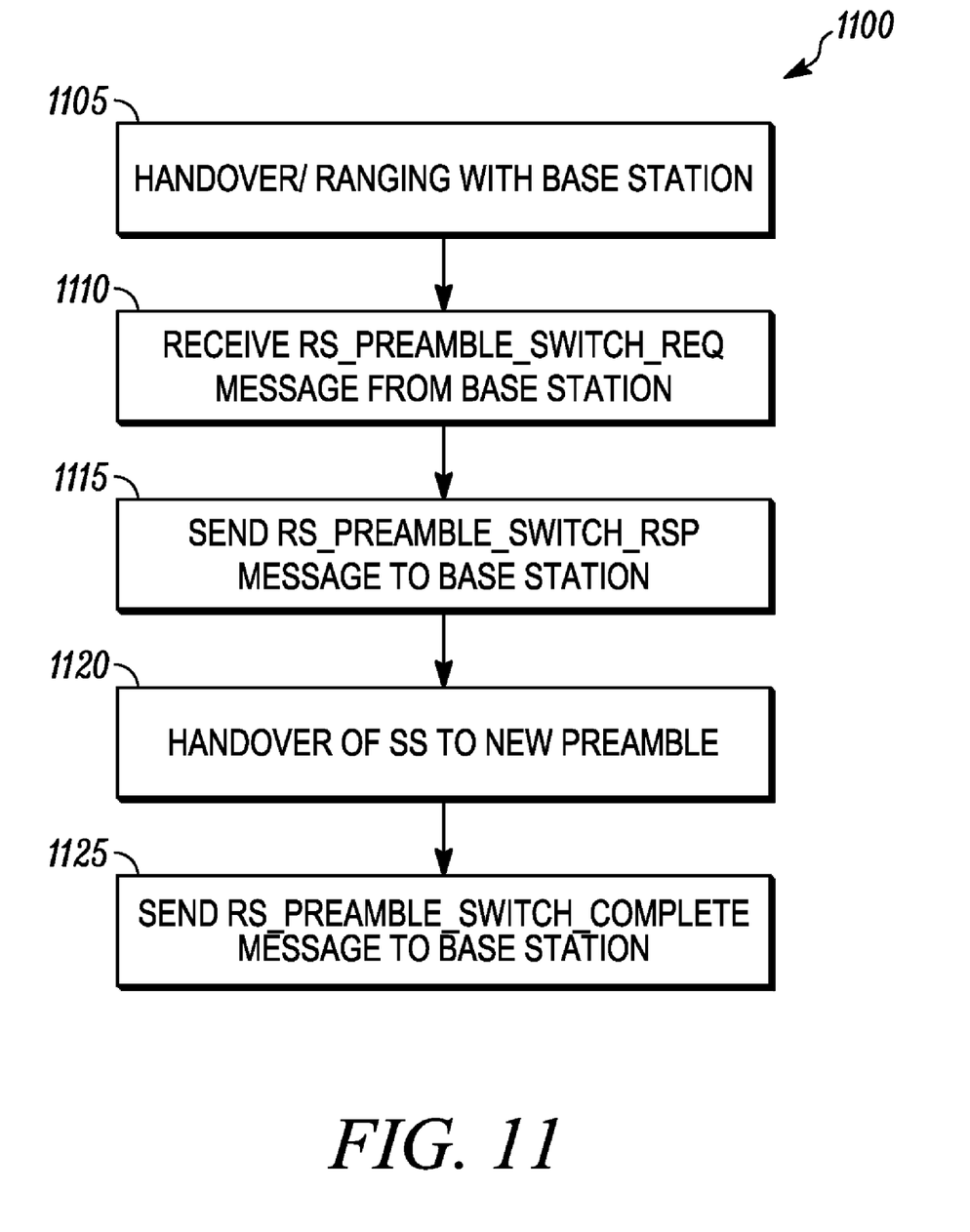
FIG. 11 is a flowchart illustrating an exemplary operation of the relay station of FIG. 3 in accordance with at least some embodiments of the present invention.

FIG. 11 is a flowchart illustrating an exemplary preamble assignment procedure 1100 at a relay station when performing handover into a base station's cell. As illustrated, the operation begins with Step 1105 in which the base station and the relay station perform a handover/ranging process into the cell for the relay station. Next, in Step 1110, the RS receives a RS-PREAMBLE-SWITCH-REQ message to instruct the relay to switch to the new preamble. Next, in Step 1115, the RS sends a RS-PREAMBLE-SWITCH-RSP message and initiates the preamble switching procedure, Next, in Step 1120, the RS performs handover of the SS under its control from the old to the new preamble. Next, in Step 1125, when SS handover is complete, the RS stops transmitting the old preamble and transmits a RS-PREAMBLE-SWITCH-COMPLETE message to the BS.

SS Handover Procedure at the RS

Several options exist for efficiently performing SS handover to the new preamble. Note that the overhead associated with this handover is much less than with the standard 802.16e handover between two separate network entities, since in this case SS are performing handover to the same node. Hence, all MAC layer state parameters, such automatic repeat request (ARQ) and segmentation sequence numbers, and all PHY layer state parameters, such as transmit power and UL launch times, remain valid and need not be transmitted over the backbone. The details of the handover procedure are based on the existing 802.16e signaling protocol, and hence are transparent to the SS, In what follows, preambles A and B denote the old and new preambles assigned to the RS, respectively.

In a first embodiment, the RS transmits preamble A. Following receiving of the RS-PREAMBLE-SWITCH-REQ message, RS begins to transmit preamble B in the following frame.

With this option, the various SS under the RS control will lose synchronization with the old preamble and will begin ranging and handover procedure to the new preamble. However, this process could be efficiently managed at the RS by relying on the 802.16e—defined Fast Ranging process, as the SS are already correctly time-advanced to the RS. Hence, the RS could immediately schedule allocations for UL transmissions from the SS.

In a second embodiment, the RS transmits preamble A. Following receiving of the RS-PREAMBLE-SWITCH-REQ message, RS transmits a direct sum of preamble A and preamble B. Following some predetermined time, RS begins to transmit only preamble B.

This option can be viewed as a "soft" hand-off version of the first embodiment, where the RS temporarily assumes the identity of both MAC instantiations corresponding to the two preambles. When transmitting both preambles A and B, pre-amble B will be transmitted at a higher power than pre-amble A so that SS entering the system or performing handover to the RS will use preamble B. With this option, SS could be handed over from preamble A to preamble B gradually.

When transmitting both preambles A and B at the same time, if nothing is done, preambles A and B and the associated control information, such as DL and UL, Maps, will interfere with each other.

In order to avoid interference, several steps can be taken to avoid interference, For example, if partial PUSC subchannelization (PUSC ⅓) is used at the RS, then the new preamble could be assigned to another unused segment. Alternatively, if full PUSC is used at the relay, then the interference between control data transmissions of the two MAC instances may be unavoidable. However, it could be mitigated with the following procedure:

For both MAC instances use short DL/UL MAPs with maximum repetition to send all the mandatory information (e.g., FCH). As these MAC messages are short, they will create minimal interference due to the inherent randomness of the PUSC patterns.

In each map, include a Sub-UL-DL-MAP-Pointer_IE which points to private sub-maps that carry actual assignments to be used for the MAC instance. These sub-maps are on non-overlapping symbols, and hence they will not interfere, For data transmissions, non-overlapping zones could be allocated by each of the maps for the corresponding MAC instances.

During the transient period when both preambles A and B are transmitted, SS are handed off from MAC instance A to MAC instance B using the existing IEE802.16-2005 MOB_*messages.

Option to turn-off SS-directed preamble transmission

As the mobile RS traverses the cell, it will perform periodic ranging to the BS. As the BS measures the timing advance of the RS, it may determine its approximate distance to the RS. If the RS is deemed close to the BS, an optional command may be sent to the RS to completely turn-off its SS-directed preamble transmission. This is because inside the cell, most of the benefits due to relaying is expected to come on uplink, whereas downlink transmissions would be delivered directly to the SS from the BS. Once, the RS turns-off its preamble transmission, 802.16e—defined fast ranging handover process will be used to hand the SS to the BS. The command to turn-off the preamble could be signaled via the RS-PREAMBLE-SWITCH-REQ message by transmitting an null preamble index. In addition to time advance, a variety of other metrics such as RSSI and CINR could be used to decide to switch-off the RS preamble.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operation of a relay station within a multi-hop wireless communication system comprising:
    communicating with a first network device using a first preamble;
    moving within range of a second network device;
    communicating the first preamble to the second network device;
    receiving a preamble switch message from the second network device when the second network device determines that the first preamble is included in a list of forbidden preambles, wherein the preamble switch message includes a second preamble, wherein the second preamble is included in a list of permissible preambles;
    switching to the second preamble for communicating with the second network device.

2. A method of operation of a multi-hop wireless communication system comprising:
    communicating by a relay station with one or more subscriber stations along each of a respective path using a current subscriber station directed preamble;
    initiating an association transfer between a base station and the relay station including the relay station providing the current subscriber station directed preamble to the base station;
    comparing by the base station the current subscriber station directed preamble to a list of forbidden preambles;
    selecting by the base station a second subscriber station directed preamble from a group of permissible preambles when the current subscriber station directed preamble is included in the list of forbidden preambles;
    sending a switch preamble instruction message including the second subscriber station directed preamble from the base station to the relay station; and
    switching by the relay station to the second subscriber station directed preamble for communication with the one or more subscriber stations along each of the same respective path.

3. A method of operation of a multi-hop wireless communication system as claimed in claim 2, further comprising:
    adding the second subscriber station directed preamble to the list of forbidden preambles.

4. A method of operation of a multi-hop wireless communication system as claimed in claim 3, further comprising:
    detecting a disassociation of the relay station from the base station; and
    deleting the second subscriber station directed preamble from the list of forbidden preambles.

5. A method of operation of a multi-hop wireless communication system as claimed in claim 2, further comprising:
    adding the current subscriber station directed preamble to the list of forbidden preambles when the current subscriber station directed preamble is not included in the list of forbidden preambles.

6. A method of operation of a multi-hop wireless communication system as claimed in claim 5, further comprising:
    detecting a disassociation of the relay station from the base station; and
    deleting the current subscriber station directed preamble from the list of forbidden preambles.

7. A method of operation of a multi-hop wireless communication system as claimed in claim 2, further comprising:
    performing a subscriber station handover between the relay station and the one or more subscriber stations to the second subscriber station directed preamble prior to the switching step.

8. A method of operation of a multi-hop wireless communication system as claimed in claim 7, wherein the performing the subscriber station handover step comprises:
    transmitting the current subscriber station directed preamble from the relay station to the one or more subscriber stations;
    in response to the switching step, transmitting the second subscriber station directed preamble in a following frame from the relay station to the one or more subscriber stations; and
    ranging and handover processing of the second subscriber station directed preamble by the one or more subscriber stations.

9. A method of operation of a multi-hop wireless communication system as claimed in claim 7, wherein the performing the subscriber station handover step comprises:
    transmitting the current subscriber station directed preamble from the relay station to the one or more subscriber stations;
    in response to the switching step, transmitting a direct sum of the current subscriber station directed preamble and the second subscriber station directed preamble from the relay station to the one or more subscriber stations; and transmitting the second subscriber station directed preamble after a predetermined time from the relay station to the one or more subscriber stations.

10. A method of operation of a multi-hop wireless communication system as claimed in claim 9, wherein a set of possible preambles correspond to a plurality of segments, each segment occupying one of a plurality of possible subcarriers, and further wherein the current subscriber station directed preamble and the second subscriber station directed preamble correspond to a same segment of the plurality of segments.

11. A method of operation of a multi-hop wireless communication system as claimed in claim 9, wherein a set of possible preambles correspond to a plurality of segments, each segment occupying one of a plurality of possible subcarriers, and further wherein the current subscriber station directed preamble corresponds to a first segment of the plurality of segments, and the second subscriber station directed preamble corresponds to a second segment of the plurality of segments.

12. A method of operation of a multi-hop wireless communication system as claimed in claim 2, further comprising:

disabling transmissions by the relay station to one or more subscriber stations by turning off the second subscriber station directed preamble; and performing a handover from the relay station to the base station with the one or more subscriber stations.

13. A method of operation of a multi-hop wireless communication system as claimed in claim 12, further comprising prior to the disabling step:

determining a distance from the relay station to the base station is at least equal to a predetermined disabling distance.

14. A method of operation of a relay station as claimed in claim 1, wherein the second preamble minimizes an interference condition within a neighborhood of the relay station.

15. A method of operation of a multi-hop wireless communication system as claimed in claim 2, wherein the second subscriber station directed preamble minimizes an interference condition within a neighborhood of the relay station.

* * * * *

UNITED STATES PATENT AND TRADEMARK OFFICE
CERTIFICATE OF CORRECTION

| | | |
|---|---|---|
| PATENT NO. | : 7,742,452 B2 | Page 1 of 1 |
| APPLICATION NO. | : 11/620456 | |
| DATED | : June 22, 2010 | |
| INVENTOR(S) | : Visotsky et al. | |

It is certified that error appears in the above-identified patent and that said Letters Patent is hereby corrected as shown below:

In Column 1, Line 14, delete "infrastucture-based" and insert -- infrastructure-based --, therefor.

In Column 1, Line 37, delete "network," and insert -- network. --, therefor.

In Column 3, Lines 10-11, delete "element," and insert -- element. --, therefor.

In Column 3, Line 48, delete "repeaters)," and insert -- repeaters). --, therefor.

In Column 5, Line 23, delete "information," and insert -- information. --, therefor.

In Column 6, Line 4, delete "15-n" and insert -- 115-n --, therefor.

In Column 6, Line 19, delete "respectively," and insert -- respectively. --, therefor.

In Column 7, Line 19, delete "illustrated" and insert -- illustrated, --, therefor.

In Column 7, Line 20, delete "(not shown)," and insert -- (not shown). --, therefor.

In Column 7, Line 62, delete "itself" and insert -- itself. --, therefor.

In Column 8, Line 9, delete "substantial" and insert -- substantially --, therefor.

In Column 8, Line 22, delete "invention," and insert -- invention. --, therefor.

In Column 8, Line 31, delete "BS," and insert -- BS. --, therefor.

In Column 8, Line 59, delete "list," and insert -- list. --, therefor.

In Column 9, Line 41, delete "invention," and insert -- invention. --, therefor.

In Column 9, Line 43, delete "size," and insert -- size. --, therefor.

In Column 9, Line 59, delete "size," and insert -- size. --, therefor.

In Column 10, Line 4, delete "procedure," and insert -- procedure. --, therefor.

In Column 10, Line 22, delete "SS," and insert -- SS. --, therefor.

In Column 10, Line 56, delete "interference," and insert -- interference. --, therefor.

In Column 11, Line 5, delete "interfere," and insert -- interfere. --, therefor.

In Column 11, Line 11, delete "IEE" and insert -- IEEE --, therefor.

Signed and Sealed this
Eighth Day of January, 2013

David J. Kappos
*Director of the United States Patent and Trademark Office*